(12) United States Patent
Gulmammadov et al.

(10) Patent No.: US 12,541,681 B2
(45) Date of Patent: Feb. 3, 2026

(54) DISCRETE OPTIMIZATION OF CONFIGURATION ATTRIBUTES

(71) Applicant: Oracle International Corporation, Redwood Shores, CA (US)

(72) Inventors: Tural Gulmammadov, Toronto (CA); Manish Kumar, Bengaluru (IN); Padala Siva Sai Ram Venkata Reddy, Bangalore (IN); Hariram Kannan, Bangalore (IN); David Hamm, Surrey (CA)

(73) Assignee: Oracle International Corporation, Redwood Shores, CA (US)

( * ) Notice: Subject to any disclaimer, the term of this patent is extended or adjusted under 35 U.S.C. 154(b) by 1207 days.

(21) Appl. No.: 17/216,396

(22) Filed: Mar. 29, 2021

(65) Prior Publication Data
US 2022/0309338 A1  Sep. 29, 2022

(51) Int. Cl.
*G06Q 30/02* (2023.01)
*G06N 3/04* (2023.01)
*G06N 3/08* (2023.01)
*G06Q 10/0637* (2023.01)
*G06Q 30/0202* (2023.01)

(52) U.S. Cl.
CPC .................. *G06N 3/08* (2013.01); *G06N 3/04* (2013.01); *G06Q 10/06375* (2013.01); *G06Q 30/0202* (2013.01)

(58) Field of Classification Search
None
See application file for complete search history.

(56) References Cited

U.S. PATENT DOCUMENTS 7,986,935 B1   7/2011   D'Souza et al.
8,738,482 B2   5/2014   Leo et al.
(Continued)

FOREIGN PATENT DOCUMENTS

CN   103793513 A       5/2014
CN   103793513 B   *   4/2017   ......... G06F 16/2465

OTHER PUBLICATIONS

Achyuth et al., Recommender system for prepaid mobile recharging using APIS—shorturl.at/rADG5, 6 pages.
(Continued)

*Primary Examiner* — Alan Torrico-Lopez
(74) *Attorney, Agent, or Firm* — Invoke

(57) ABSTRACT

Techniques for configuring an entity are disclosed. The techniques include generating, based on multiple sets of features inputted into a machine learning model, predictions of multiple sets of performance metrics for multiple configurations of the entity. The techniques also include calculating a change in efficiency between each configuration in the multiple configurations and the base configuration based on a first set of performance metrics for the base configuration and a second set of performance metrics generated by the machine learning model for the configuration. The techniques further include determining, based on values of the change in efficiency calculated for the multiple configurations, a second set of configuration values with a highest increase in efficiency over the base configuration. The techniques additionally include causing the second set of configuration values to be outputted in association with the entity.

24 Claims, 5 Drawing Sheets

(56) References Cited

U.S. PATENT DOCUMENTS

| | | | |
|---|---|---|---|
| 2005/0256778 A1 | 11/2005 | Boyd et al. | |
| 2006/0143027 A1 | 6/2006 | Jagannathan et al. | |
| 2011/0244826 A1 | 10/2011 | Krishnan et al. | |
| 2017/0046614 A1* | 2/2017 | Golovashkin | G06N 3/082 |
| 2018/0293486 A1* | 10/2018 | Bajic | G06N 3/084 |
| 2020/0162336 A1* | 5/2020 | Gonguet | H04L 41/0893 |
| 2021/0027182 A1* | 1/2021 | Harris | G06N 20/20 |
| 2021/0241865 A1* | 8/2021 | Bhattacharya | G06N 20/00 |

OTHER PUBLICATIONS

Ahmad et al., "Customer churn prediction in telecom using machine learning in big data platform," J. Big Data, 6:28 (2019), 24 pages.
Exacaster: Prepaid customer segmentation in telecommunications, Exacaster—https://www.exacaster.com/wp-content/uploads/2014/02/Segmentation-for-Prepaid.-An-Overview-of-Common-Practices.pdf, (2013), 16 pages.
How to optimize your portfolio in the fast-paced telecom industry—https://skimgroup.com/cases/optimize-portfolio-fast-paced-telecom-industry/, Oct. 22, 2020, 5 pages.
Maji et al., "Designing Combo Recharge Plans for Telecom Subscribers Using Itemset Mining Technique," IEEE, (2017), pp. 1232-1237.
Minimize customer churn with analytics, IBM Software Business Analytics—https://www.targetmarketingmag.com/promo/minimizecustomerchurn.pdf, 3 pages.

* cited by examiner $$\begin{pmatrix} r_1 & m_1 & a_1 & c_1 \\ r_2 & m_2 & a_2 & c_2 \\ r_3 & m_3 & a_3 & c_3 \end{pmatrix} = \begin{pmatrix} 1 & x_{11} & x_{12} & \ldots & x_{1p} \\ 1 & x_{21} & x_{22} & \ldots & x_{2p} \\ 1 & x_{31} & x_{32} & \ldots & x_{3p} \end{pmatrix} \begin{pmatrix} b_{01} & b_{02} & b_{03} & b_{04} \\ b_{21} & b_{22} & b_{23} & b_{24} \\ \ldots & \ldots & \ldots & \ldots \\ b_{p1} & b_{p2} & b_{p3} & b_{p4} \end{pmatrix} + \begin{pmatrix} e_{11} & e_{12} & e_{13} & e_{14} \\ e_{21} & e_{22} & e_{23} & e_{24} \\ e_{31} & e_{32} & e_{33} & e_{34} \end{pmatrix}$$

202　　　　　　　204　　　　　　　　206　　　　　　　208

DISCRETE OPTIMIZATION OF CONFIGURATION ATTRIBUTES

TECHNICAL FIELD

The present disclosure relates to configuring an entity. In particular, the present disclosure relates to discrete optimization of configuration attributes for an entity.

BACKGROUND

Advances in technology have lead to an increase in the available options for configuring a product, service, or other entity. For example, telecommunications companies (telecoms) that previously provided basic wired telephony services to users have now expanded into mobile phone services with various voice, Short Message Service (SMS), and data options; high-speed Internet access with different types of connections, speeds, and/or caps on data transmission; and/or television services delivered over satellite, cable, optical fiber, and/or streaming video. A given plan with a telecom provider may thus include several to dozens of different "attributes" that can be configured (e.g., number of voice minutes, number of SMS messages, amount of data, roaming, contract length, cancellation penalty, bundling with TV/Internet services, etc.). Each of these attributes additionally includes at least several different possible values. Consequently, the telecom provider may be required to select, from hundreds to millions of possible plan configurations (e.g., all possible combinations of all possible values of the plan options), a limited number of plans with attributes that are most likely to appeal to various segments of customers.

Despite this explosion in configuration options, conventional techniques for selecting configuration options for various goods and services continue to rely on manual and/or brute force methods that incur significant resource consumption and/or time overhead. Continuing with the above example, a user involved in creating or managing telecom plans may consume computation resources by interacting with a user interface to manually select plan options for different types of telecom plans. After a plan is created and offered to customers, the user may consume additional computational resources to collect, aggregate, and/or analyze customer feedback or metrics related to the plan's popularity, customer retention, and/or other indicators of the plan's performance. The user may incur further resource overhead by making manual adjustments to the plan, creating new plans, and/or deactivating the plan based on the feedback or metrics. The user may also repeat this process to incorporate new options and/or services into the telecom plans and/or update the telecom plans to reflect the latest user preferences and/or performance indicators. Because this process of manually creating and assessing telecom plans is slow and computationally inefficient, the user is unable to identify, for a given set of configuration attributes and a set of configuration values for each configuration attribute, the combination of configuration values that leads to the best-performing plan (e.g., with respect to overall revenue, customer retention, customer adoption, and/or another type of performance metric).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. DISCRETE OPTIMIZATION OF CONFIGURATION ATTRIBUTES
4. EXAMPLE EMBODIMENT
5. OPTIMIZING CONFIGURATION ATTRIBUTES
6. COMPUTER NETWORKS AND CLOUD NETWORKS
7. MISCELLANEOUS; EXTENSIONS
8. HARDWARE OVERVIEW

1. General Overview

Techniques for configuring an entity are disclosed. Examples described herein, which should not be construed to limit the scope of any of the claims or disclosed embodiments, refer to entities such as plans offered by telecommunications companies and/or other types of products or services. A configuration for an entity includes a set of configuration attributes. A system assigns each configuration attribute a configuration value that is selected from a set of possible configuration values. The system uses a machine learning model to predict multiple sets of performance metrics for multiple configurations of an entity. Each configuration inputted into the machine learning model includes one or more configuration values that deviate from a base configuration (e.g., an existing configuration) for the entity.

The system combines each set of performance metrics with a set of weights into an "efficiency" representing an overall performance of the corresponding configuration. Each weight used to calculate the efficiency represents a relative importance or contribution of the corresponding performance metric to the efficiency.

The system also creates a graph representation of possible configurations for the entity is created. Each node in the graph represents a possible configuration value for the entity. Pairs of nodes in the graph that represent configuration values for different configuration attributes are connected by edges. The system assigns, to each edge, an edge weight representing the change in efficiency between the base configuration and a configuration that includes configuration values represented by the two nodes connected by the edge. The system uses the graph representation to determine a set of configuration values with a highest increase in efficiency over the base configuration. The system then outputs the set of configuration values as a recommended configuration for the entity and/or uses the configuration values to create a new configuration for the entity.

One or more embodiments described in this Specification and/or recited in the claims may not be included in this General Overview section.

2. Architectural Overview

Figure 1:
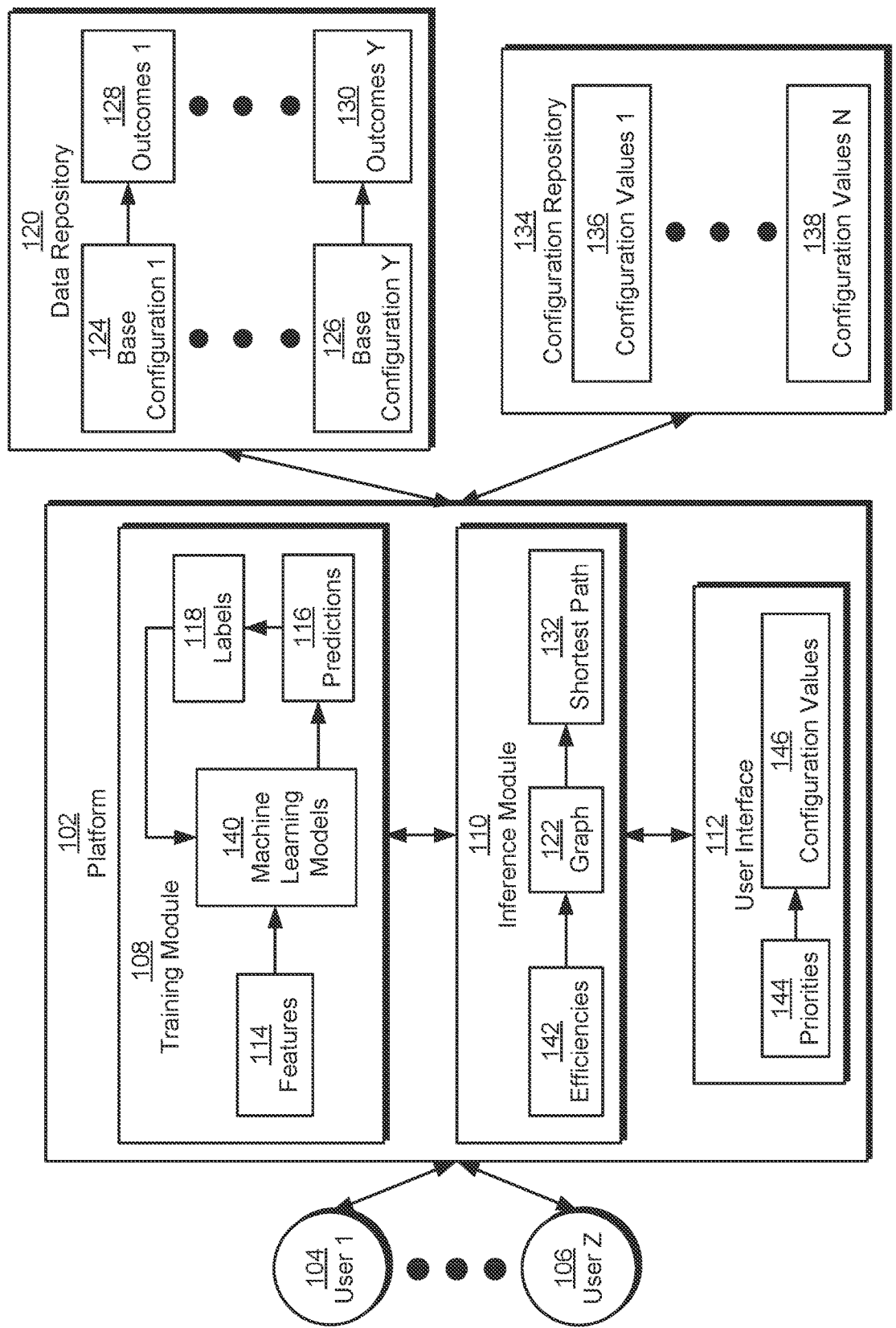
FIG. 1 illustrates a system in accordance with one or more embodiments.

FIG. 1 illustrates a system in accordance with one or more embodiments. As illustrated in FIG. 1, the system includes a platform 102 that interacts with a set of users (e.g., user 1 104, user z 106) to perform tasks and/or provide functionality related to configurations for one or more entities. For example, platform 102 may include a cloud-based or online system that allows the users to search, browse, and/or otherwise explore the entities and/or configuration values (e.g., configuration values 1 136, configuration values n 138) with which the entities are configured.

In one or more embodiments, an entity includes computer hardware, computer software, a physical component, a mechanical assembly, a resource, and/or another type of product or service. The entity can be configured using a number of configuration attributes. A given configuration of the entity includes a specific configuration value selected for each of the configuration attributes. This configuration value is selected from a set of possible configuration values for the corresponding configuration attribute.

For example, the entity may be a telecommunications plan that includes one or more telecommunications services offered to users. Configuration attributes for the telecommunications plan may include (but are not limited to) a number of voice minutes, an amount of data, a data access speed, a number of Short Message Service (SMS) messages, a roaming option, a service or feature that is bundled with the plan (e.g., streaming video, television, high-speed internet, etc.), the price of the plan, a promotional discount on the price, a duration of the promotional discount, and/or a contract length associated with the plan. Each configuration attribute additionally includes a set of possible configuration values that can be assigned to the configuration attribute. Thus, the number of voice minutes offered in the telecommunications plan can be selected from {100, 200, 500, unlimited}, the amount of data can be selected from {2 GB, 4 GB, 8 GB, unlimited}, the number of SMS messages can be selected from {500, 1000, unlimited}, the roaming option can be selected from {no roaming, regional roaming, international roaming}, the price of the plan can be selected from {$50, $70, $90, $120}, the promotional discount can be selected from {5%, 10%, 20%}, the duration of the promotional discount can be selected from {one month, two months, three months, six months}, and so on.

As shown in FIG. 1, platform 102 includes a user interface 112 that receives input from the users and displays output in response to the input. For example, user interface 112 includes a graphical user interface (GUI), web-based user interface, command line interface (CLI), voice user interface, and/or another type of user interface that allows the users to access the functionality of platform 102. Input received via user interface 112 includes (but is not limited to) a set of priorities 144 associated with performance metrics and/or other criteria related to the corresponding entity or entities. For example, user interface 112 may receive input that includes alphabetic ratings, numeric scores, a ranking, and/or other types of user-specified priorities 144 with respect to an entity to be configured. In the context of a telecommunications plan, priorities 144 may identify the relative importance of revenue, profit margin, customer acquisition, customer churn, and/or another performance metric with which the telecommunications plan is evaluated.

In some embodiments, user-specified priorities 144 for configuring an entity are normalized into a set of weights that sum to 1. Continuing with the above example, numeric priorities 144 of 4, 2, 2, and 0 for revenue, profit margin, customer acquisition, and customer churn for a telecommunications plan may be normalized into respective weights of 0.5, 0.25, 0.25, and 0.

In turn, output produced by user interface 112 in response to priorities 144 and/or other user input includes one or more sets of configuration values 146 that can be used to configure the corresponding entity. For example, user interface 112 may display a ranking of multiple sets of configuration values 146 for an entity by descending compatibility with a corresponding set of priorities 144. In another example, user interface 112 may provide sliders, drop-down menus, checkboxes, radio buttons, and/or other user-interface elements that allow users to manually select, filter, and/or specify individual configuration values 146 and/or combinations of configuration values 146 for the entity and view estimates of compatibility between the selected configuration value(s) and priorities 144 (e.g., the extent to which configuration values 146 for a telecommunications plan meet or optimize priorities 144 related to revenue, margin, customer acquisition, customer churn, and/or other performance indicators).

Those skilled in the art will appreciate that the number of ways in which a given entity can be configured grows exponentially with the number of configuration attributes and/or the number of possible configuration values in each configuration attribute. For example, a telecommunications plan with 20 different configuration attributes and 100 possible configuration values for each configuration attribute would have 100^20 possible plan configurations. This combinatorial explosion renders a brute force and/or manual search of all possible configurations for a given configuration that best meets one or more priorities 144, goals, and/or criteria to be computationally infeasible.

In one or more embodiments, platform 102 efficiently identifies one or more sets of configuration values 146 that optimize for priorities 144 related to a corresponding entity. Platform 102 then outputs the identified configuration values 146 in user interface 112 and/or via another output mechanism. In particular, one or more components of platform 102 use the output from one or more machine learning models 140 to predict efficiencies 142 of multiple sets of configuration values for a given entity. In various embodiments, an efficiency of a given set of configuration values represents a combination of predicted performance metrics for the set of configuration values scaled by the corresponding priorities 144 (or another aggregation of the performance metrics and/or priorities 144 into an overall performance measure or attribute). The component(s) also populate a graph 122 with nodes representing possible configuration values for the set of configuration attributes by which the entity can be configured and edges that represent changes in efficiencies 142 between different sets of configuration values. A shortest path 132 in graph 122 is then used to identify a set of configuration values 146 that is best at optimizing for the specified priorities 144. As described in further detail below, this technique identifies the set of configuration values 146 that results in the highest efficiency with respect to priorities 144 while reducing computational complexity and/or resource overhead over brute force or naïve techniques that search all possible combinations of configuration values for the best set of configuration values.

3. Discrete Optimization of Configuration Attributes

As mentioned above, platform 102 may use one or more machine learning models 140 and a graph-based representation of possible configuration values for configuring an entity to efficiently find a set of configuration values 146 that maximizes the overall efficiency of the entity, where the efficiency is determined with respect to a set of priorities 144 for a set of performance metrics and/or outcomes. As shown in FIG. 1, platform 102 includes a training module 108 that trains one or more machine learning models 140 based on training data that includes one or more sets of features 114 and one or more sets of labels 118.

In some embodiments, features 114 include representations of one or more base configurations (e.g., base configuration 1 124, base configuration y 126) of one or more entities. Labels 118 include one or more sets of outcomes (e.g., outcomes 1 128, outcomes y 130) related to the corresponding base configurations. The base configurations and outcomes may be stored in association with one another in a relational database, key-value store, distributed filesystem, and/or another type of data repository 120. One or more base configurations and corresponding outcomes may then be retrieved from data repository 120 by platform 102 and used by training module 108 to train machine learning models 140.

Each base configuration may include a current or previous set of configuration values for an entity, and a corresponding set of outcomes for the base configuration may include performance metrics collected for the entity with the set of configuration values. For example, a base configuration for a telecommunications plan offered by a company may include configuration values such as the current and/or previous number of minutes, number of SMSes, amount of data, roaming, bundled services, price, discount, discount duration, and/or other "plan details" for the telecommunications plan. The base configuration may be mapped to and/or associated with values of revenue, margin, customer acquisition, customer churn, and/or other performance indicators or metrics collected for the base configuration over one or more time periods.

To train machine learning models 140, training module 108 inputs features 114 into each machine learning model and obtains one or more predictions 116 as output from the machine learning model. Training module 108 then uses a training technique (e.g., stochastic gradient descent, least squares, maximum likelihood estimation, etc.) and/or one or more hyperparameters to update the parameters (e.g., neural network weights, regression coefficients, etc.) of the machine learning model so that predictions 116 better reflect the corresponding labels 118.

In one or more embodiments, machine learning models 140 include a multivariate linear regression model that generates predictions 116 representing multiple sets of performance metrics or outcomes for multiple base configurations of an entity (or individual base configurations for multiple entities) at the same time, given multiple sets of features 114 representing the base configurations. For example, the multivariate linear regression model may be trained to predict labels 118 that include three sets of four values for revenue, margin, customer acquisition, and customer churn for three different telecommunications plans offered by a telecommunications company at the same time. Features 114 inputted into the multivariate linear regression model include spectral and/or temporal values extracted from a time series representation of configuration values in each base configuration. In turn, coefficients of the trained multivariate linear regression model may capture interactions and/or dependencies among the three telecommunications plans and/or configuration values in the telecommunications plans. Multivariate linear regression models for predicting multiple sets of outcomes for multiple entity configurations are described in further detail below with respect to FIG. 2A.

Those skilled in the art will appreciate that other types of machine learning models 140 may be trained to generate predictions 116 that reflect features 114 and labels 118. For example, machine learning models 140 may include, but are not limited to, regression models, decision trees, support vector machines, neural networks, deep learning models, factorization machines, ensemble models, clustering techniques, Bayesian networks, naïve Bayes classifiers, clustering techniques, decision trees, random forests, and/or other types of models for performing statistical and/or mathematical inference.

After machine learning models 140 are trained, an inference module 110 in platform 102 inputs additional sets of configuration values (e.g., configuration values 1 136, configuration values n 138) for one or more entities into machine learning models 140. Inference module 110 also calculates efficiencies 142 for the sets of configuration values using the corresponding output from machine learning models 140.

As shown in FIG. 1, inference module 110 may retrieve the additional sets of configuration values from a database, distributed filesystem, key-value store, and/or another data store providing a configuration repository 134. Each set of configuration values in configuration repository 134 includes a fixed number of configuration values that deviate from a set of configuration values in a corresponding base configuration of an entity. Inference module 110 and/or another component of platform 102 may determine all possible sets of configuration values that include the fixed number of configuration values that deviate from those of the base configuration. These sets of configuration values are stored in configuration repository 134 for subsequent retrieval and use.

More specifically, inference module 110 inputs one or more sets of configuration values from configuration repository 134 into one or more machine learning models 140. Next, inference module 110 obtains predictions 116 of performance metrics or outcomes for the corresponding entity or entities as output from the machine learning model(s). Inference module 110 combines each set of predicted performance metrics or outcomes with representations of priorities 144 into an efficiency (e.g., efficiencies 142) for the corresponding set of configuration values. In some embodiments, the efficiency includes a numeric or other value representing the extent to which the set of configuration values optimizes for priorities 144.

The operation of inference module 110 in calculating efficiencies 142 for multiple sets of configuration values from configuration repository 134 may be illustrated using the example multivariate linear regression model described above. This multivariate linear regression model can be trained to predict three sets of four values for revenue, margin, customer acquisition, and customer churn for three different telecommunications plans offered by a telecommunications company at the same time.

To calculate efficiencies 142 using this multivariate linear regression model, inference module 110 retrieves, from configuration repository 134, a set of configuration values that includes two configuration values that deviate from the original configuration values in a first telecommunications plan (out of the three telecommunications plans offered by the telecommunications company) while keeping the configuration values for the second and third telecommunications plans the same. Inference module 110 inputs features 114 representing the configuration values for the three telecommunications plans into the multivariate linear regression model, and the multivariate linear regression model generates predictions 116 of revenue, margin, customer acquisition, and customer churn for each of the three telecommunications plans. Inference module 110 then calculates an efficiency for the first telecommunications plan with the two changed configuration values as a weighted combination of the predicted revenue, margin, customer acquisition, and customer churn for the telecommunications plan. Weights in the weighted combination can include the normalized priorities 144 of revenue, margin, customer acquisition, and customer churn for that telecommunications plan. Inference module 110 may repeat the process with a new set of configuration values for the first telecommunications plan from configuration repository 134 until efficiencies 142 have been calculated for all sets of configuration values for the first telecommunications plan.

Second, inference module 110 retrieves, from configuration repository 134, individual sets of configuration values that include two configuration values that deviate from the original configuration values in a second telecommunications plan (out of the three telecommunications plans offered by the telecommunications company) while keeping the configuration values for the other first and third telecommunications plans the same. Inference module 110 applies the multivariate linear regression model to features 114 representing the configuration values for all three telecommunications plans to produce predictions 116 of revenue, margin, customer acquisition, and customer churn for each of the three telecommunications plans. Inference module 110 then calculates an efficiency for the second telecommunications plan with the two changed configuration values as a weighted combination of the predicted revenue, margin, customer acquisition, and customer churn for the telecommunications plan. Weights in the weighted combination are the same as those used to calculate efficiencies 142 for the first telecommunications plan. Inference module 110 may repeat the process with a new set of configuration values for the second telecommunications plan from configuration repository 134 until efficiencies 142 have been calculated for all sets of configuration values for the second telecommunications plan.

Third, inference module 110 retrieves, from configuration repository 134, individual sets of configuration values that include two configuration values that deviate from the original configuration values in a the third telecommunications plan (out of the three telecommunications plans offered by the telecommunications company) while keeping the configuration values for the first and second telecommunications plans the same. Inference module 110 applies the multivariate linear regression model to features 114 representing the configuration values for all three telecommunications plans to produce predictions 116 of revenue, margin, customer acquisition, and customer churn for each of the three telecommunications plans. Inference module 110 then calculates an efficiency for the third telecommunications plan with the two changed configuration values as a weighted combination of the predicted revenue, margin, customer acquisition, and customer churn for the telecommunications plan. Weights in the weighted combination are the same as those used to calculate efficiencies 142 for the first and second telecommunications plans. Inference module 110 may repeat the process with a new set of configuration values for the third telecommunications plan from configuration repository 134 until efficiencies 142 have been calculated for all sets of configuration values for the third telecommunications plan.

Further, the operation of inference module 110 in calculating efficiencies for variations of the three telecommunications plans is parallelizable. For example, inference module 110 may use multiple processing nodes to calculate predictions 116 for multiple sets of configuration values from configuration repository 134 at the same time. After a given set of predictions 116 is generated by a processing node, the same processing node or a different processing node may be used to aggregate the set of predictions 116 into an efficiency for the corresponding set of configuration values.

After efficiencies 142 are calculated for all sets of configuration values in configuration repository 134, inference module 110 populates graph 122 with a set of nodes and a set of edges. Nodes in graph 122 represents possible configuration values for a set of configuration attributes with which a corresponding entity can be configured. Edges in graph connect pairs of nodes representing configuration values for different types of configuration attributes.

Inference module 110 also assigns, to each edge in graph 122, an edge weight representing a change in efficiency between the base configuration of the entity and an alternative configuration that includes two configuration values represented by the pair of nodes connected by the edge. When the edge connects a pair of nodes representing configuration values in the base configuration, inference module 110 sets the edge weight to 0 (since there is no change in efficiency for configurations with identical configuration values). Inference module 110 then identifies shortest path 132 as a path in graph 122 with the lowest sum of edge weights, out of all paths that include exactly one node for each configuration attribute with which the entity can be configured.

The operation of inference module 110 in creating graph 122 and determining shortest path 132 may be illustrated using efficiencies 142 calculated using the example multivariate linear regression model that predicts three sets of four values for revenue, margin, customer acquisition, and customer churn for three different telecommunications plans offered by a telecommunications company at the same time. First, inference module 110 calculates a change in efficiency between the base configuration for each of the three telecommunications plans and each alternative configuration represented by a set of configuration values for the same telecommunications plan in configuration repository 134 by subtracting the efficiency of the alternative configuration from the efficiency of the base configuration. Thus, a negative change in efficiency indicates that the alternative configuration has a greater efficiency than the base configuration, while a positive change in efficiency indicates that the alternative configuration has a lower efficiency than the base configuration.

Next, inference module 110 creates a separate graph 122 for each of the three telecommunications plans. Within a given graph 122, inference module 110 organizes the nodes into a sequence of layers. Each layer in the sequence represents a different configuration attribute for the corresponding telecommunications plan, and nodes in the layer represent possible configuration values for the configuration attribute. Inference module 110 then connects every node in a given layer with every node in the next layer. For example, inference module 110 may create, in graph 122, four layers of 10 nodes each to represent four different configuration attributes for the telecommunications plan and 10 possible configuration values for each configuration attribute. Inference module 110 may then add, to graph 122, a first set of directed edges from all nodes in the first layer to all nodes in the second layer, a second set of directed edges from all nodes in the second layer with all nodes in the third layer, and a third set of directed edges from all nodes in the third layer with all nodes in the fourth layer. Inference module 110 may also assign, to each edge, an edge weight that is equal to the change in efficiency between the base configuration of the telecommunications plan and the alternative configuration with configuration values represented by the two nodes connected by the edge.

After graph 122 is created, inference module 110 uses a shortest path technique (e.g., Dijkstra's, Bellman-Ford, A*, etc.) to identify shortest path 132 as the path with the lowest sum of edge weights, out of all paths that traverse all layers in graph 122. Continuing with the above example, inference module 110 may identify shortest path 132 as a path with the lowest sum of edge weights, out of all paths that include one node in the first layer, one node in the second layer, one node in the third layer, and one node in the fourth layer. When the shortest path technique operates using only non-negative weights, edge weights in graph 122 may be normalized to non-negative numbers before shortest path 132 is determined.

As with the calculation of efficiencies 142 for different sets of configuration values, operations related to determining shortest path 132 may be performed in parallel. For example, inference module 110 may use multiple processing nodes to generate a different graph 122 for each of the telecommunications plans at the same time. After one or more processing nodes create graph 122 for a given telecommunications plan, the same processing node(s) or one or more different processing nodes may be used to determine shortest path 132 in graph 122.

After shortest path 132 is identified in each graph 122 representing an entity for which efficiencies 142 have been calculated, platform 102 outputs, in user interface 112, configuration values 146 represented by nodes in shortest path 132. For example, platform 102 may generate a recommendation, notification, message, alert, and/or another type of output within user interface 112 that includes an optimal configuration for an entity, given a set of priorities 144 for the entity. The optimal configuration includes a set of configuration values 146 represented by a given shortest path 132 in the corresponding graph 122. Platform 102 may additionally output the entity to which the set of configuration values 146 pertains, the overall efficiency or change in efficiency between the set of configuration values 146 and a corresponding base configuration for the entity, priorities 144 for the entity, and/or other information that provides context related to the outputted configuration values 146. A user may interact with user interface 112 to view additional sets of configuration values 146 for the same entity (e.g., configuration values 146 represented by the second shortest path, third shortest path, etc. in graph 122), specify a different set of priorities 144 by which the most optimal configuration of the entity is to be determined, compare efficiencies 142 for different configurations of the entity, add or remove configuration attributes and/or configuration values with which the entity can be configured, generate additional output that triggers the creation of the entity using a particular set of configuration values 146, and/or perform other tasks related to configuring the entity.

By using machine learning models 140 and graph 122 to determine optimal configuration values 146 for a set of priorities 144 related to the performance of a given entity, platform 102 reduces computational complexity and resource overhead over brute force techniques that assess efficiencies 142 for all possible combinations of configuration values 146 for the entities. At the same time, platform 102 consumes fewer resources in determining an optimal configuration than conventional computer-implemented techniques for configuring entities. For example, a conventional technique may involve multiple steps, in which a user manually selects configuration values for an entity within a user interface; uses one or more applications to collect, aggregate, and/or analyze feedback or metrics related to the entity's performance; and iteratively updates the configuration values within the user interface over months or years based on the feedback or metrics. Each of these steps or iterations involves consumption of significant computational resources and is typically repeated over time. In contrast, platform 102 may train machine learning models 140, calculate efficiencies 142 for multiple sets of configuration values for an entity, and use graph 122 and shortest path 132 to identify the most optimal set of configuration values 146 for a set of priorities 144 in a number of hours or days. Thus, by reducing user and resource overhead associated with conventional or naïve techniques for selecting and evaluating configurations, the system of FIG. 1 improves the use of technologies, computer systems, and user interfaces for creating, assessing, and updating configurations for entities.

In one or more embodiments, platform 102 may include more or fewer components than the components illustrated in FIG. 1. For example, training module 108, inference module 110, and user interface 112 may include, execute with, or exclude one another. In another example, data repository 120 and configuration repository 134 may be implemented by the same or different components. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a repository (e.g., data repository 120, configuration repository 134) is any type of storage unit and/or device (e.g., a file system, database, collection of tables, or any other storage mechanism) for storing data. The repository may be implemented or may execute on the same computing system as training module 108, inference module 110, and user interface 112 or on a computing system that is separate from training module 108, inference module 110, and user interface 112. The repository may be communicatively coupled to training module 108, inference module 110, and user interface 112 via a direct connection or via a network. Further, the repository may include multiple different storage units and/or devices. The multiple different storage units and/or devices may or may not be of the same type or located at the same physical site.

In one or more embodiments, platform 102 refers to hardware and/or software configured to perform operations described herein for optimizing configurations for entities based on pre-specified priorities 144. Examples of such operations are described below.

In an embodiment, platform 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, user interface 112 refers to hardware and/or software configured to facilitate communications between a user and platform 102. User interface 112 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of user interface 112 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interface 112 is specified in one or more other languages, such as Java, C, or C++.

4. Example Embodiment

A detailed example is described below for purposes of clarity. Components and/or operations described below should be understood as one specific example, which may not be applicable to certain embodiments. Accordingly, components and/or operations described below should not be construed as limiting the scope of any of the claims.

Figures 2A, 2B:
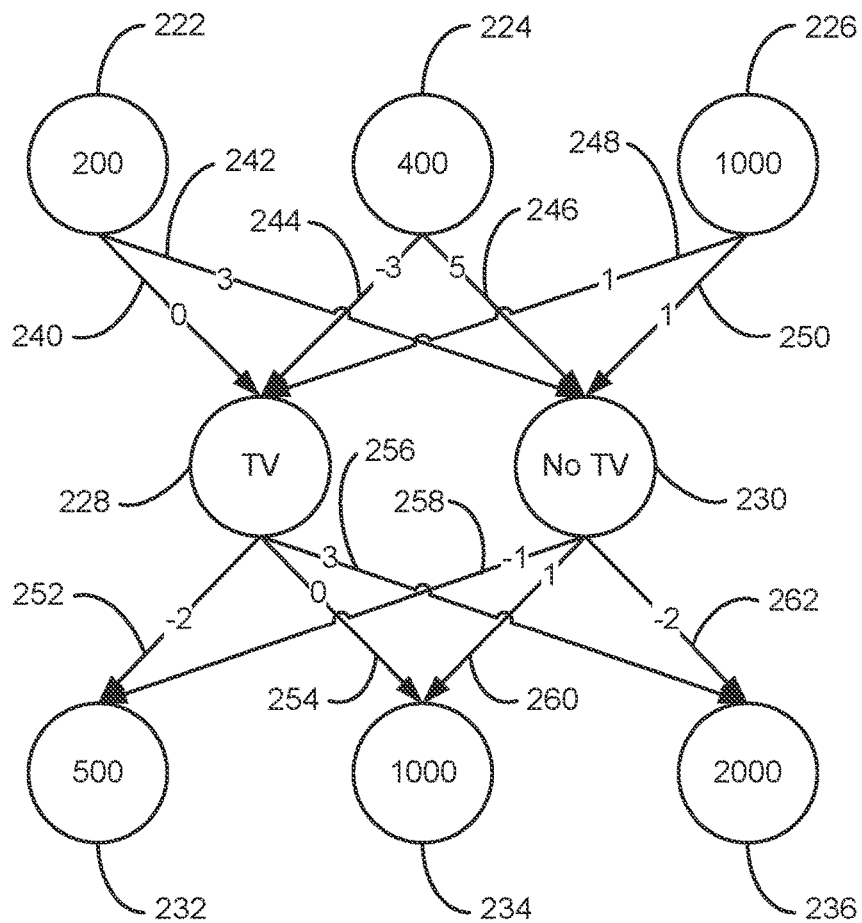
FIG. 2A illustrates an example representation of a machine learning model that predicts a set of performance metrics for a grouping of entities in accordance with one or more embodiments.
FIG. 2B illustrates an example graph that is used to optimize configuration attributes for an entity in accordance with one or more embodiments.

FIG. 2A illustrates an example representation of a machine learning model (e.g., machine learning models 140 of FIG. 1) that predicts a set of performance metrics for a grouping of entities in accordance with one or more embodiments. More specifically, FIG. 2A shows an example representation of a multivariate linear regression model that is used to predict performance metrics and/or outcomes related to three telecommunications plans that are concurrently offered by a company (e.g., three different "plan options" from which users can choose). As shown in FIG. 2A, the multivariate linear regression model includes a first portion 202, a second portion 204, a third portion 206, and a fourth portion 208.

Portion 202 includes a matrix representation of predictions (e.g., predictions 116 of FIG. 1) generated by the multivariate linear regression model. Each row in the matrix represents a different telecommunications plan, which is indexed by a corresponding number 1, 2, or 3, and each column in the matrix represents a different value to be predicted. Elements of "$r_1$," "$r_2$," and "$r_3$" in the first column represent revenue for the three plans; elements of "$m_1$," "$m_2$," and "$m_3$" in the second column represent profit margin for the three plans; elements of "$a_1$," "$a_2$," and "$a_3$" represent customer acquisition for the three plans; and elements of "$c_1$," "$c_2$," and "$c_3$" represent customer churn for the three plans.

Portion 204 includes a matrix representation of features (e.g., features 114 of FIG. 1) inputted into the multivariate linear regression model, which is multiplied with a matrix representation of regression coefficients in portion 206. Portion 208 includes a matrix representation of error terms, which are added to the result of multiplying portions 204 and 206 to produce values in portion 202.

Each row in portion 204 indicates that a corresponding telecommunications plan is represented by "p" different features. These "p" features and a first element of 1 in each row of portion 204 are combined with "p+1" coefficients from each of four columns in portion 206 to produce four values for the telecommunications plan. Each of the four values is then summed with one of four error terms in the corresponding row of portion 208 to produce predictions of revenue, margin, customer acquisition, and customer churn for the telecommunications plan.

In one or more embodiments, features in portion 204 include spectral and/or temporal features extracted from time series data representing configuration values for configuration attributes in each telecommunications plan. For example, configuration attributes for each telecommunications plan may include (but are not limited to) a voice tier representing a number of voice minutes, a messaging tier representing a number of SMS messages, a data tier representing an amount of data, roaming, contract length, cancellation penalty, bundling with TV/Internet services, price, price discount, discount duration, and/or other "plan details" that define the telecommunications plan. Each configuration attribute may be represented by a time series of configuration values for the configuration attribute, which spans a certain time period (e.g., a number of months, years, etc.) and has a certain granularity (e.g., every second, day, week, month, etc.). Time series data for each configuration attribute in each telecommunications plan may be converted into features that include (but are not limited to) a mel-frequency ceptral coefficient (MFCC), a linear predictive ceptral coefficient (LPCC), a fast Fourier transform (FFT) coefficient, an autocorrelation, an absolute energy, a power spectrum value, a spectral centroid, an area under a curve, a wavelet energy, a wavelet absolute mean, a wavelet entropy, a wavelet standard deviation, and/or a wavelet variance. Thus, the "p" features representing a given telecommunications plan may include multiple subsets of spectral and/or temporal features, where each subset of features is extracted from a time series of configuration values for a corresponding configuration attribute in the telecommunications plan.

In turn, the multivariate linear regression model may be trained to generate predictions for a period occurring after the time period spanned by the time series data from which the features in portion 204 were extracted. For example, predictions represented by elements of portion 202 may include values of revenue, margin, customer acquisition, and customer churn over a number of months or years after the end of the time period spanned by the time series data from which the features in portion 204 were generated. During training of the multivariate linear regression model, coefficients in portion 206 and/or error terms in portion 208 are selected or updated to capture interactions and/or correlations among the features of all three telecommunications plans. In turn, the trained multivariate linear regression model is able to account for the effect of configuration values in a given telecommunications plan on revenue, margin, customer adoption, customer churn, and/or other performance metrics for the other two telecommunications plans.

In one or more embodiments, users that potentially subscribe to the telecommunications plans are grouped into multiple user segments, where each user segment represents a group of users that share one or more common attributes. For example, user segments may be defined to include users with the same location, language, income range, age range, and/or other demographic attributes. In another example, user segments may to include users with similar usage or purchasing patterns with respect to products, services, prices, or discounts in the telecommunications plans. In a third example, a dimensionality reduction and/or clustering technique may be used to group the users, as represented by an arbitrary set of attributes, into distinct user segments.

When multiple user segments exist for users that subscribe to the telecommunications plans, the multivariate linear regression model can be trained to include a different set of regression coefficients and error terms for each user segment. For example, the multivariate linear regression model may learn a different set of values in portions 206-208 for each of three different user segments, where the user segments include users from different age ranges. The multivariate linear regression model thus includes functionality to predict a different set of performance metrics for each user segment, given the same set of input features. These distinct sets of model parameters and corresponding predictions allow the predicted performance of each telecommunications plan to be evaluated (and subsequently optimized) with respect to a corresponding user segment instead of all users.

FIG. 2B illustrates an example graph that is used to optimize configuration attributes for an entity in accordance with one or more embodiments. In particular, FIG. 2B shows a graph representing a telecommunications plan.

As shown in FIG. 2B, the graph includes a number of nodes 222-236 and a number of edges 240-254 connecting pairs of the nodes. Within the graph, nodes 222-236 are arranged into three layers: a first layer that includes three nodes 222-226, a second layer that includes two nodes 228-230, and a third layer that includes three nodes 232-236.

The graph additionally includes directed edges 240-262 that connect all nodes in a given layer with all nodes in the next layer.

Thus, node 222 in the first layer is connected via edges 240 and 242 to respective nodes 228 and 230 in the second layer. Node 224 in the first layer is connected via edges 244 and 246 to respective nodes 228 and 230 in the second layer. Node 226 in the first layer is connected via edges 248 and 250 to respectively nodes 228 and 230 in the second layer.

Similarly, node 228 in the second layer is connected via edges 252, 254, and 256 to respective nodes 232, 234, and 236 in the third layer. Node 230 in the second layer is connected via edges 258, 260, and 262 to respective nodes 232, 234, and 236 in the third layer.

In some embodiments, each layer of nodes represents a set of available configuration values for a corresponding configuration attribute in the telecommunications plan. For example, nodes 222-226 in the first layer may represent values of 200, 400, and 1000 voice minutes in the telecommunications plan, respectively. Node 228 in the second layer may represent an option for adding television service to the telecommunications plan, and node 230 in the second layer may represent an option for omitting television (TV) service from the telecommunications plan. Nodes 232-236 in the third layer may represent values of 500, 1000, and 2000 SMS messages included in the telecommunications plan, respectively.

An edge weight for each edge in edges 240-262 represents a change in efficiency between a configuration that includes configuration values represented by the pair of nodes connected by the edge and a base configuration for the telecommunications plan (e.g., a current configuration for the telecommunications plan). As shown in FIG. 2B, edges 240 and 254 have edge weights of 0, indicating that nodes 222, 228, and 234 represent configuration values used in the base configuration. Edges 242, 246, 248, 250, 256, and 260 have respective positive edge weights of 3, 5, 1, 1, 3, and 1, which indicates that configuration values represented by pairs of nodes 222 and 230, 224 and 230, 226 and 228, 226 and 230, 228 and 236, and 230 and 234 have lower efficiency than the corresponding configuration values in the base configuration. Edges 244, 252, 258, and 262 have respective negative edge weights of −3, −2, −1, and −2, which indicates that configurations with configuration values represented by pairs of nodes 224 and 228, 228 and 232, 230 and 232, and 230 and 236 have greater efficiency than the corresponding configuration values in the base configuration.

A shortest graph technique can be used to identify a shortest path in the graph as the path with the lowest overall sum of edge weights, out of all paths with one node in the first layer, one node in the second layer, and one node in the third layer. For example, the shortest graph technique may determine that the shortest path includes edge 244 connecting nodes 224 and 228 and edge 252 connecting nodes 228 and 232. This shortest path has a sum of edge weights of −3+−2, or −5, which is lower than the sums of edge weights of other paths that connect a first node in the first layer with a second node in the second layer and the second node with a third node in the third layer.

When the shortest graph technique operates using only non-negative edge weights, edge weights assigned to edges 240-262 may be normalized to have non-negative values before the shortest graph technique is applied to the graph. For example, edge weights ranging from −3 to 5 in the graph may be normalized to non-negative edge weights ranging from 1 to 9 by shifting the lowest edge weight of −3 to 1 (e.g., by adding 4 to −3) and shifting all other edge weights by the same amount. After the edge weights are shifted, previous edge weights of 0 for edges 240 and 254 that connect nodes 222, 228, and 234 representing the configuration values in the base configuration are shifted to new edge weights of 4.

In turn, nodes 224, 228, and 232 in the shortest path represent configuration values for the most "efficient" configuration of the telecommunications plan. In other words, the shortest path indicates that a configuration with 400 voice minutes, a bundled TV service, and 500 SMS messages will result in the most optimal values of revenue, margin, customer acquisition, customer churn, and/or other performance metrics, given a set of priorities (e.g., priorities 144 of FIG. 1) for the telecommunications plan. The configuration values may then be outputted in a user interface (e.g., user interface 112 of FIG. 1) and/or used to generate a new version of the telecommunications plan, as discussed above.

5. Optimizing Configuration Attributes

Figure 3:
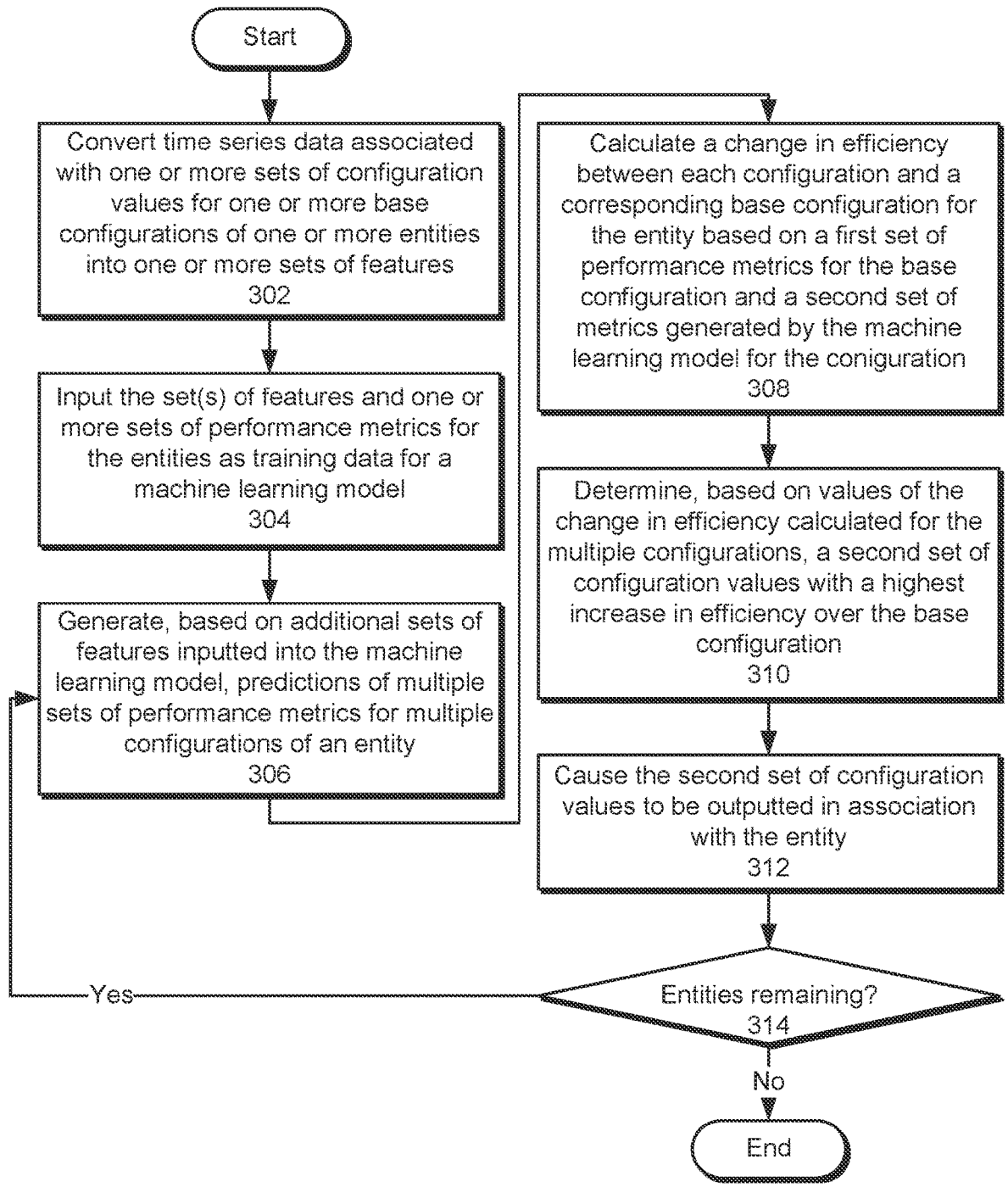
FIG. 3 illustrates a flowchart of configuring an entity in accordance with one or more embodiments.

FIG. 3 illustrates a flowchart of configuring an entity in accordance with one or more embodiments. In one or more embodiments, one or more of the steps may be modified, omitted, repeated, and/or performed in a different order. Accordingly, the specific arrangement of steps shown in FIG. 3 should not be construed as limiting the scope of one or more embodiments.

Initially, time series data associated with one or more sets of configuration values for one or more base configurations of one or more entities is converted into one or more sets of features (operation 302). For example, the time series data may track the configuration values for the configuration attributes in each base configuration over time. Each set of features may include spectral and/or temporal features extracted from the time series data for a corresponding base configuration. The spectral and/or temporal features may include, but are not limited to, a MFCC, LPCC, FFT coefficient, autocorrelation, absolute energy, power spectrum value, spectral centroid, area under a curve, wavelet energy, wavelet absolute mean, wavelet entropy, wavelet standard deviation, and/or wavelet variance.

Next, the set(s) of features and one or more sets of performance metrics for the entities are inputted as training data for a machine learning model (operation 304). For example, the features may be inputted into a multivariate linear regression model, and the regression coefficients of the multivariate linear regression model may be updated to minimize the error between the output of the multivariate linear regression model and a set of performance metrics for the base configuration(s). The performance metrics may be collected or aggregated over one or more time periods that over lap with and/or occur after the time period spanned by the time series data from which the set(s) of features were extracted.

After the machine learning model is trained, predictions of multiple sets of performance metrics for multiple configurations of an entity are generated based on additional sets of features inputted into the machine learning model (operation 306). For example, each configuration may include one or more configuration values that deviate from the current set of configuration values for the base configuration. Features generated from the configuration values in each configuration may be inputted into the machine learning model to generate predictions of performance metrics for the configuration.

A change in efficiency between each configuration and a corresponding base configuration for the entity is then calculated based on a first set of performance metrics for the base version and a second set of performance metrics generated by the machine learning model for the configuration (operation 308). For example, the first set of performance metrics may be obtained from labels used to train the machine learning model in operation 304, and the second set of performance metrics may be generated for each configuration in operation 306. The first set of performance metrics is combined with a set of weights to produce a first numeric value representing the efficiency of the base configuration, and the second set of performance metrics is combined with the same set of weights to produce a second numeric value representing the efficiency of the configuration.

The weights used to calculate the efficiencies may represent a set of priorities related to the configuration of the entity. For example, the weights may sum to 1, and each weight may represent the proportional contribution of a corresponding performance metric to the efficiency of the configuration of the entity.

Each change in efficiency may then be calculated as a difference between the efficiency of the base configuration and the efficiency of the corresponding configuration. For example, the change in efficiency may be computed by subtracting the efficiency of the configuration from the efficiency of the base configuration. As a result, a negative change in efficiency indicates that the configuration has a greater efficiency than the base configuration, and a positive change in efficiency indicates that the configuration has a lower efficiency than the base configuration.

A second set of configuration values with a highest increase in efficiency over the base configuration is determined based on values of the change in efficiency calculated for the multiple configurations (operation 310). As described in further detail below with respect to FIG. 4, operation 310 can be performed by finding a shortest path within a graph, where nodes in the graph represent possible configuration values for the entity, edges between pairs of nodes in the graph represent configuration values for different configuration attributes, and each edge is assigned an edge weight representing a change in efficiency between the base configuration of the entity and an alternative configuration that includes two configuration values represented by the pair of nodes connected by the edge. Operation 310 may also, or instead, be performed by dividing the configuration attributes into multiple subsets of configuration attributes; identifying a first set of configuration values that have the best efficiency for a first subset of configuration attributes; identifying a second set of configuration values with the best efficiency for a second subset of configuration attributes, given the first set of configuration values; and so on.

Finally, the second set of configuration values is caused to be outputted in association with the entity (operation 312). For example, the second set of configuration values may be outputted in a notification, alert, message, recommendation, file, and/or a new configuration for the entity.

Operations 306-312 may be repeated for remaining entities (operation 314) to be configured. For example, operations 306-312 may be used to determine efficiencies for configurations of each individual entity offered as a product or service by a company, identify the most efficient configuration of each entity, and generate output that includes configuration values for the most efficient entity.

Figure 4:
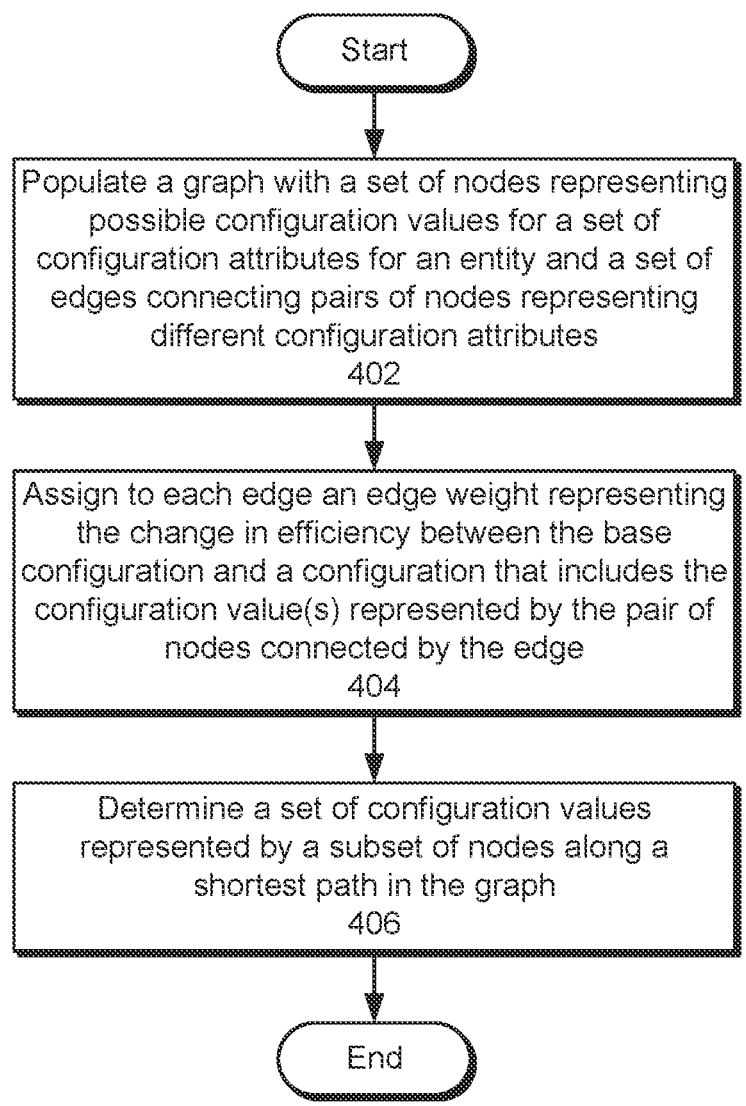
FIG. 4 illustrates a flowchart of determining a set of configuration values with a highest increase in efficiency over a base configuration of an entity, in accordance with one or more embodiments.

FIG. 4 illustrates a flowchart of determining a set of configuration values with a highest increase in efficiency over a base configuration of an entity, in accordance with one or more embodiments. In one or more embodiments, one or more of the steps may be modified, omitted, repeated, and/or performed in a different order. Accordingly, the specific arrangement of steps shown in FIG. 4 should not be construed as limiting the scope of one or more embodiments.

First, a graph is populated with a set of nodes representing possible configuration values for a set of configuration attributes for an entity and a set of edges connecting pairs of nodes representing different configuration attributes (operation 402). For example, nodes in the graph may be arranged into a sequence of layers, where each layer includes a subset of nodes representing some or all possible configuration values for a corresponding configuration attribute. Directed edges may then be added from each node within a given layer in the sequence to all nodes within the next layer in the sequence.

Next, an edge weight representing the change in efficiency between a base configuration for the entity and a configuration that includes one or more configuration values represented by the pair of nodes connected by the edge is assigned to each edge (operation 404). As mentioned above, the change in efficiency may be calculated as the difference between the efficiency of the base configuration and the efficiency of the configuration. A normalization factor may optionally be applied to the edge weight, so that negative edge weights for edges in the graph are converted into non-negative edge weights.

A set of configuration values represented by subset of nodes along a shortest path in the graph is then determined (operation 406). For example, a shortest path technique may be used to identify a shortest path as the path with the lowest sum of edge weights, out of all paths that traverse all layers in the graph. Nodes in the shortest path may represent configuration values that result in the most efficient configuration of the entity, as discussed above.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
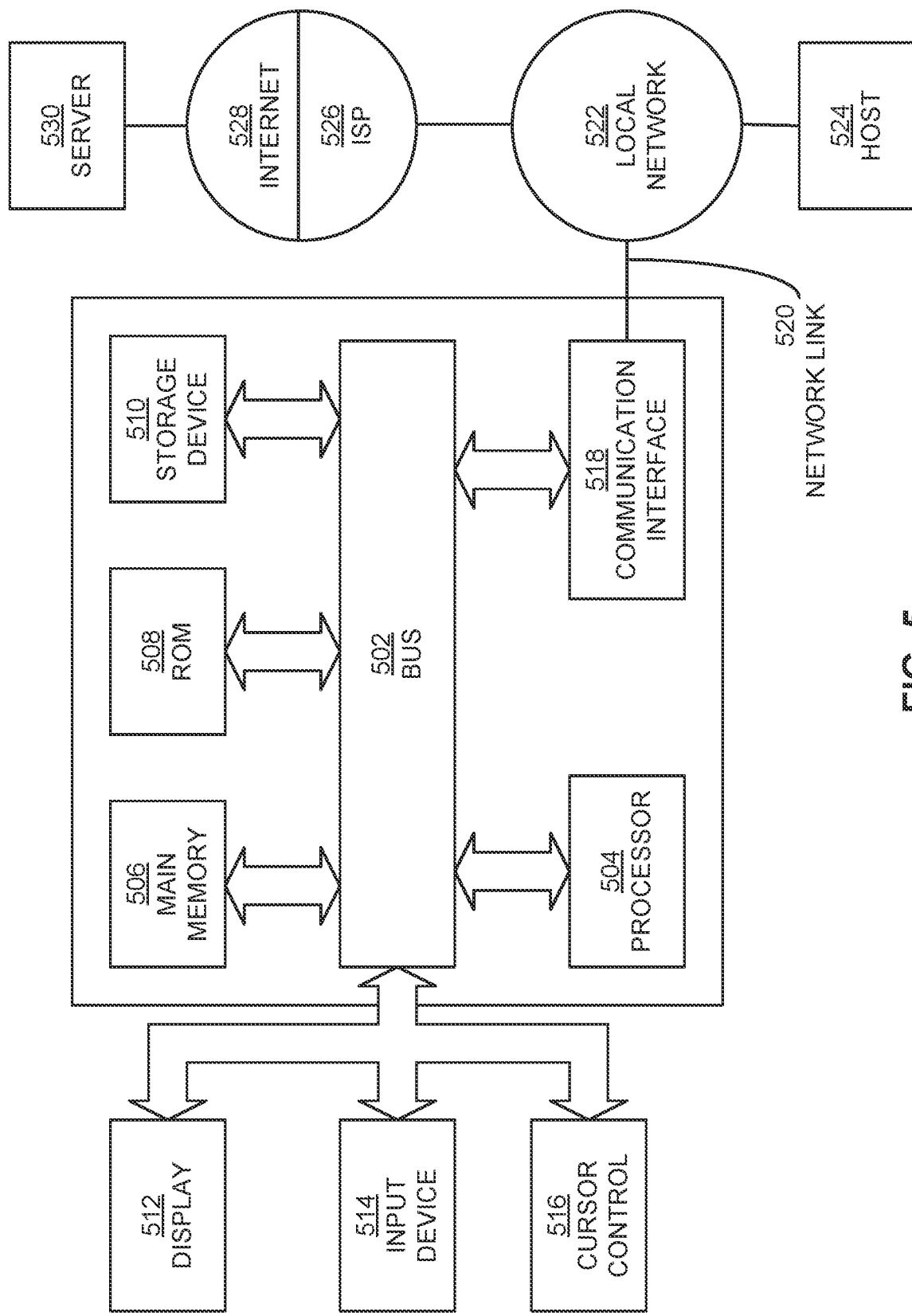
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   generating a telecommunications plan, wherein the telecommunications plan specifies telecommunications services being provided to a user, at least by:
   generating, based on multiple sets of features inputted into a machine learning model, predictions of multiple sets of performance metrics for multiple configurations of the telecommunications plan;
   for each configuration in the multiple configurations, calculating a change in efficiency between a base configuration for the telecommunications plan and the configuration based on a first set of performance metrics for the base configuration and a second set of performance metrics generated by the machine learning model for the configuration;
   determining, based on values of the change in efficiency calculated between the base configuration and the multiple configurations, a second set of configuration values with an increase in efficiency over the base configuration for modifying the telecommunications plan at least by:
   generating a digital representation of a directed graph comprising a set of nodes and a set of edges, wherein the set of nodes represents available configuration values for a set of configuration attributes for the telecommunications plan and the set of edges connects pairs of nodes representing pairs of configuration values for different configuration attributes;
   assigning to each edge in the set of edges an edge weight representing the change in efficiency between the base configuration and a corresponding configuration that includes a pair of configuration values represented by the pair of nodes connected by the edge; and
   determining the second set of configuration values represented by a subset of the nodes along a shortest path in the directed graph, wherein
   modifying the telecommunications plan is based on determining the second set of configuration values corresponds to the increase in efficiency over the base configuration and comprises modifying configuration settings for controlling real-time data packet transmission at a telecommunications network node to perform at least one of:
   modifying a limit for an amount of data that is being transmitted to and/or from a communications device associated with the user; or
   modifying a data transmission speed for data transmitted to and/or from the communications device associated with the user.

2. The medium of claim 1, wherein the operations further comprise:
   converting time series data associated with a first set of configuration values for the base configuration into a first set of features; and
   inputting the first set of features and the first set of performance metrics as training data for the machine learning model.

3. The medium of claim 2, wherein the operations further comprise:
   converting additional time series data associated with one or more sets of configuration values for one or more additional entities into one or more sets of features; and
   inputting the one or more sets of features and one or more sets of performance metrics for the one or more additional entities as additional training data for the machine learning model.

4. The medium of claim 3, wherein the machine learning model comprises a multivariate linear regression model that is trained to predict the first set of features and the one or more sets of features based on correlations among the first set of features and the one or more sets of features.

5. The medium of claim 2, wherein the first set of features comprises at least one of a mel-frequency ceptral coefficient (MFCC), a linear predictive ceptral coefficient (LPCC), a fast Fourier transform (FFT) coefficient, an autocorrelation, an absolute energy, a power spectrum value, a spectral centroid, and an area under a curve.

6. The medium of claim 2, wherein the first set of features comprises at least one of a wavelet energy, a wavelet absolute mean, a wavelet entropy, a wavelet standard deviation, and a wavelet variance.

7. The medium of claim 1, wherein calculating the change in efficiency between the base configuration and the configuration comprises:
   combining the first set of performance metrics with a set of weights to produce a first efficiency for the base configuration;
   combining the second set of performance metrics with the set of weights to produce a second efficiency for the configuration; and
   calculating the change in efficiency based on a difference between the first efficiency and the second efficiency.

8. The medium of claim 7, wherein calculating the change in efficiency between the base configuration and the configuration further comprises:
   determining the set of weights based on a set of priorities related to configuring the telecommunications plan.

9. The medium of claim 1, wherein populating the directed graph with the set of nodes and the set of edges comprises:
   arranging the set of nodes into a sequence of layers, wherein each layer in the sequence of layers comprises a subset of the nodes representing a subset of the available configuration values for a corresponding configuration attribute; and
   adding directed edges from each node within a first layer in the sequence of layers to all nodes within a second layer following the first layer in the sequence of layers.

10. The medium of claim 1, wherein assigning to each edge in the set of edges the edge weight comprises:
    applying a normalization factor to the edge weight, wherein the normalization factor removes negative edge weights from the set of edges.

11. The medium of claim 1, wherein the multiple sets of features comprise at least one of a data tier, a price, a discount on the price, a duration of the discount, a messaging tier, a voice tier, a roaming option, and an added service.

12. The medium of claim 11, wherein the first set of performance metrics and the second set of performance metrics comprise at least one of a revenue, a margin, a customer acquisition, and a customer churn.

13. The medium of claim 1, wherein the predictions of the multiple sets of performance metrics are generated for a user segment associated with the machine learning model.

14. A method, comprising:
generating a telecommunications plan, wherein the telecommunications plan specifies telecommunications services being provided to a user, at least by:
generating, based on multiple sets of features inputted into a machine learning model, predictions of multiple sets of performance metrics for multiple configurations of the telecommunications plan;
for each configuration in the multiple configurations, calculating a change in efficiency between a base configuration for the telecommunications plan and the configuration based on a first set of performance metrics for the base configuration and a second set of performance metrics generated by the machine learning model for the configuration;
determining, based on values of the change in efficiency calculated between the base configuration and the multiple configurations, a second set of configuration values with an increase in efficiency over the base configuration for modifying the telecommunications plan at least by:
generating a digital representation of a directed graph comprising a set of nodes and a set of edges, wherein the set of nodes represents available configuration values for a set of configuration attributes for the telecommunications plan and the set of edges connects pairs of nodes representing pairs of configuration values for different configuration attributes;
assigning to each edge in the set of edges an edge weight representing the change in efficiency between the base configuration and a corresponding configuration that includes a pair of configuration values represented by the pair of nodes connected by the edge; and
determining the second set of configuration values represented by a subset of the nodes along a shortest path in the directed graph, wherein
modifying the telecommunications plan is based on determining the second set of configuration values corresponds to the increase in efficiency over the base configuration and comprises modifying configuration settings for controlling real-time data packet transmission at a telecommunications network node to perform at least one of:
modifying a limit for an amount of data that is being transmitted to and/or from a communications device associated with the user; or
modifying a data transmission speed for data transmitted to and/or from the communications device associated with the user.

15. The method of claim 14, further comprising:
converting time series data associated with one or more sets of configuration values for one or more entities into one or more sets of features; and
inputting the one or more sets of features and one or more sets of performance metrics for the one or more entities as training data for the machine learning model.

16. The method of claim 14, wherein calculating the change in efficiency between the base configuration and the configuration comprises:
combining the first set of performance metrics with a set of weights to produce a first efficiency for the base configuration;
combining the second set of performance metrics with the set of weights to produce a second efficiency for the configuration; and
calculating the change in efficiency based on a difference between the first efficiency and the second efficiency.

17. The method of claim 14, wherein determining the second set of configuration values with the highest increase in efficiency over the base configuration comprises:
populating a graph with a set of nodes and a set of edges, wherein the set of nodes represents available configuration values for a set of configuration attributes for the telecommunications plan and the set of edges connects pairs of nodes representing pairs of configuration values for different configuration attributes;
assigning to each edge in the set of edges an edge weight representing the change in efficiency for a corresponding configuration that includes a pair of configuration values represented by the pair of nodes connected by the edge; and
determining the second set of configuration attributes represented by a subset of the nodes along a shortest path in the graph.

18. The method of claim 17, wherein populating the graph with the set of nodes and the set of edges comprises:
arranging the set of nodes into a sequence of layers, wherein each layer in the sequence of layers comprises a subset of the nodes representing a subset of the available configuration values for a corresponding configuration attribute; and
adding directed edges from each node within a first layer in the sequence of layers to all nodes within a second layer following the first layer in the sequence of layers.

19. An apparatus, comprising:
one or more processors; and
memory storing instructions that, when executed by the one or more processors, cause the apparatus to perform operations comprising:
generating a telecommunications plan, wherein the telecommunications plan specifies telecommunications services being provided to a user, at least by:
generating, based on multiple sets of features inputted into a machine learning model, predictions of multiple sets of performance metrics for multiple configurations of the telecommunications plan;
for each configuration in the multiple configurations, calculating a change in efficiency between a base configuration for the telecommunications plan and the configuration based on a first set of performance metrics for the base configuration and a second set of performance metrics generated by the machine learning model for the configuration;
determining, based on values of the change in efficiency calculated between the base configuration and the multiple configurations, a second set of configuration values with an increase in efficiency over the base configuration for modifying the telecommunications plan at least by:

generating a digital representation of a directed graph comprising a set of nodes and a set of edges, wherein the set of nodes represents available configuration values for a set of configuration attributes for the telecommunications plan and the set of edges connects pairs of nodes representing pairs of configuration values for different configuration attributes;

assigning to each edge in the set of edges an edge weight representing the change in efficiency between the base configuration and a corresponding configuration that includes a pair of configuration values represented by the pair of nodes connected by the edge; and determining the second set of configuration values represented by a subset of the nodes along a shortest path in the directed graph, wherein modifying the telecommunications plan is based on determining the second set of configuration values corresponds to the increase in efficiency over the base configuration and comprises modifying configuration settings for controlling real-time data packet transmission at a telecommunications network node to perform at least one of:

modifying a limit for an amount of data that is being transmitted to and/or from a communications device associated with the user; or modifying a data transmission speed for data transmitted to and/or from the communications device associated with the user.

20. The non-transitory computer readable medium of claim 1, wherein generating the predictions of the multiple sets of performance metrics for multiple configurations of the telecommunications plan comprises:

generating a first modified set of feature values representing a first modified configuration by modifying a first feature value for a first feature from among a set of features included in the base configuration;

inputting the first modified set of feature values into the machine learning model to generate the second set of performance metrics;

generating a second modified set of feature values representing a second modified configuration by modifying a second feature value for a second feature from among the set of features included in the base configuration;

inputting the second modified set of feature values for the second modified configuration into the machine learning model to generate a third set of performance metrics; and wherein generating the digital representation of the directed graph comprises:

generating a first node among the set of nodes based on the first feature value;

generating a second node among the set of nodes based on the second feature value;

generating a first edge connecting the first node to a third node based on the second set of performance metrics; and generating a second edge connecting the second node to a fourth node based on the third set of performance metrics.

21. The non-transitory computer readable medium of claim 1, wherein generating the predictions of the multiple sets of performance metrics for multiple configurations of the telecommunications plan comprises:

(a) modifying a first feature value of a first feature among a set of features representing the base configuration to generate a first modified feature value;

(b) inputting a first modified set of feature values including the modified first feature value to the machine learning model to generate a first modified set of performance values; and (c) iteratively repeating (a) and (b) to generate both (c) a first set of performance values corresponding to a first plurality of modifications to values for the first feature and (d) a second set of performance values corresponding to a second plurality of modifications to values for a second feature among the set of features representing the base configuration, wherein generating the digital representation of the directed graph comprises generating a first set of nodes based on the first plurality of modifications to values for the first feature and a second set of nodes based on the second plurality of modifications to values for the second feature.

22. The non-transitory computer readable medium of claim 1, wherein the operations further comprise:

prior to generating the predictions of the multiple sets of performance metrics:

generating a first prediction of a first set of performance metrics based on applying a first set of feature data for a first configuration of the telecommunications plan to a first machine learning model;

determining a first change in efficiency between the base configuration and the first configuration;

receiving feedback to modify a weight applied to a first performance metric corresponding to a first feature among the set of features; and retraining the first machine learning model based on the feedback to generate a second machine learning model, wherein the multiple sets of performance metrics are generated based on inputting the multiple sets of features into the second machine learning model.

23. The non-transitory computer readable medium of claim 1, wherein the operations further comprise:

modifying services provided to the user based on modifying the telecommunications plan from a base set of configuration values to the second set of configuration values.

24. The non-transitory computer readable medium of claim 23, wherein modifying the services provided to the user comprises at least one of:

modifying a number of voice minutes available for communication between a communication device associated with the user and one or more external communication devices;

modifying the amount of data available for transmission to and from the communications device associated with the user; and modifying the data transmission speed for data transmitted to and/or from the communications device associated with the user.

* * * * *